Jan. 17, 1928.
B. A. PETERSON
WARPING APPARATUS
Filed Feb. 27, 1925
1,656,605
3 Sheets-Sheet 1
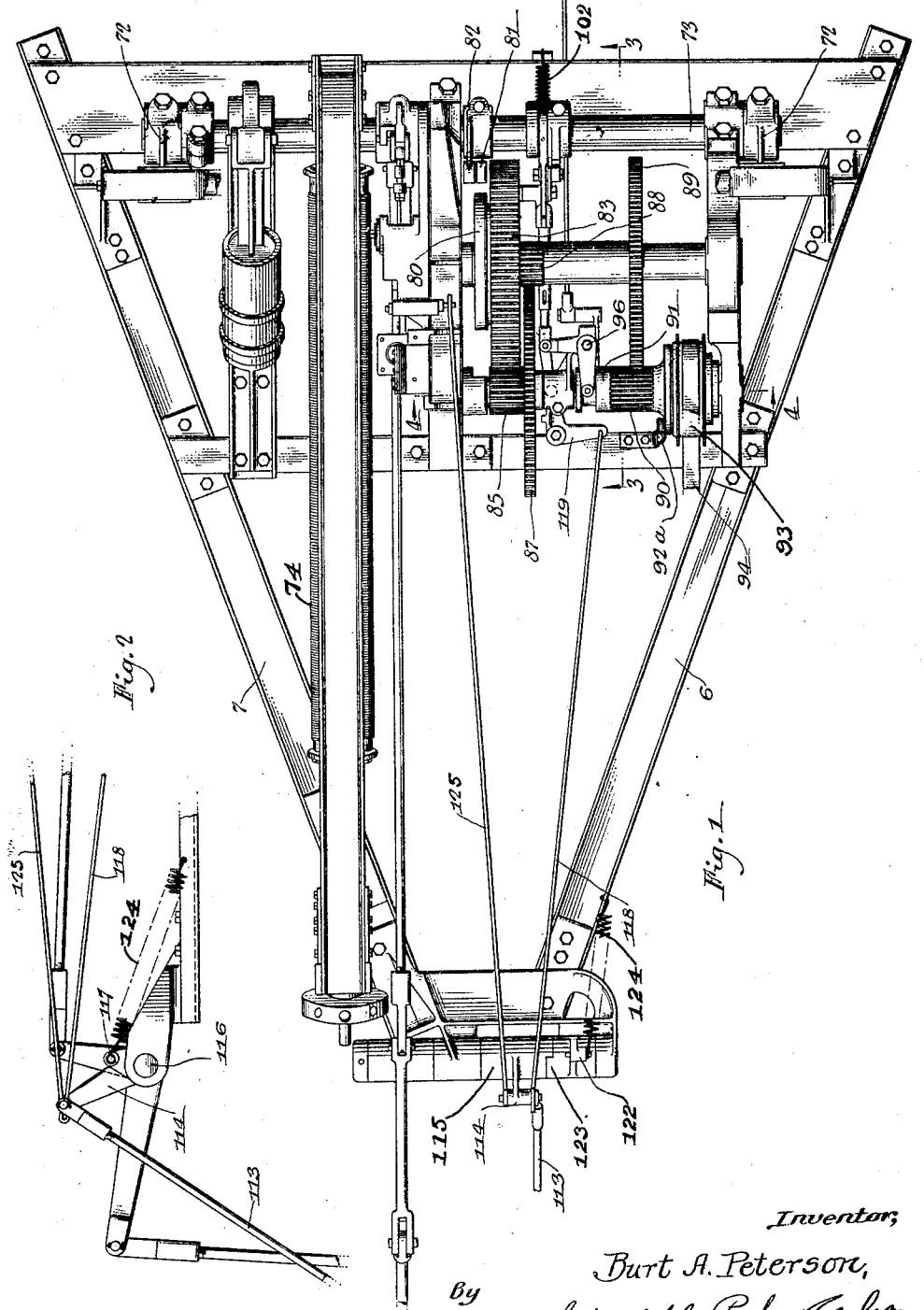
Inventor;
Burt A. Peterson,
By
Christoph Parker Carlson
Attys.

Jan. 17, 1928.
B. A. PETERSON
1,656,605
WARPING APPARATUS
Filed Feb. 27, 1925
3 Sheets-Sheet 2
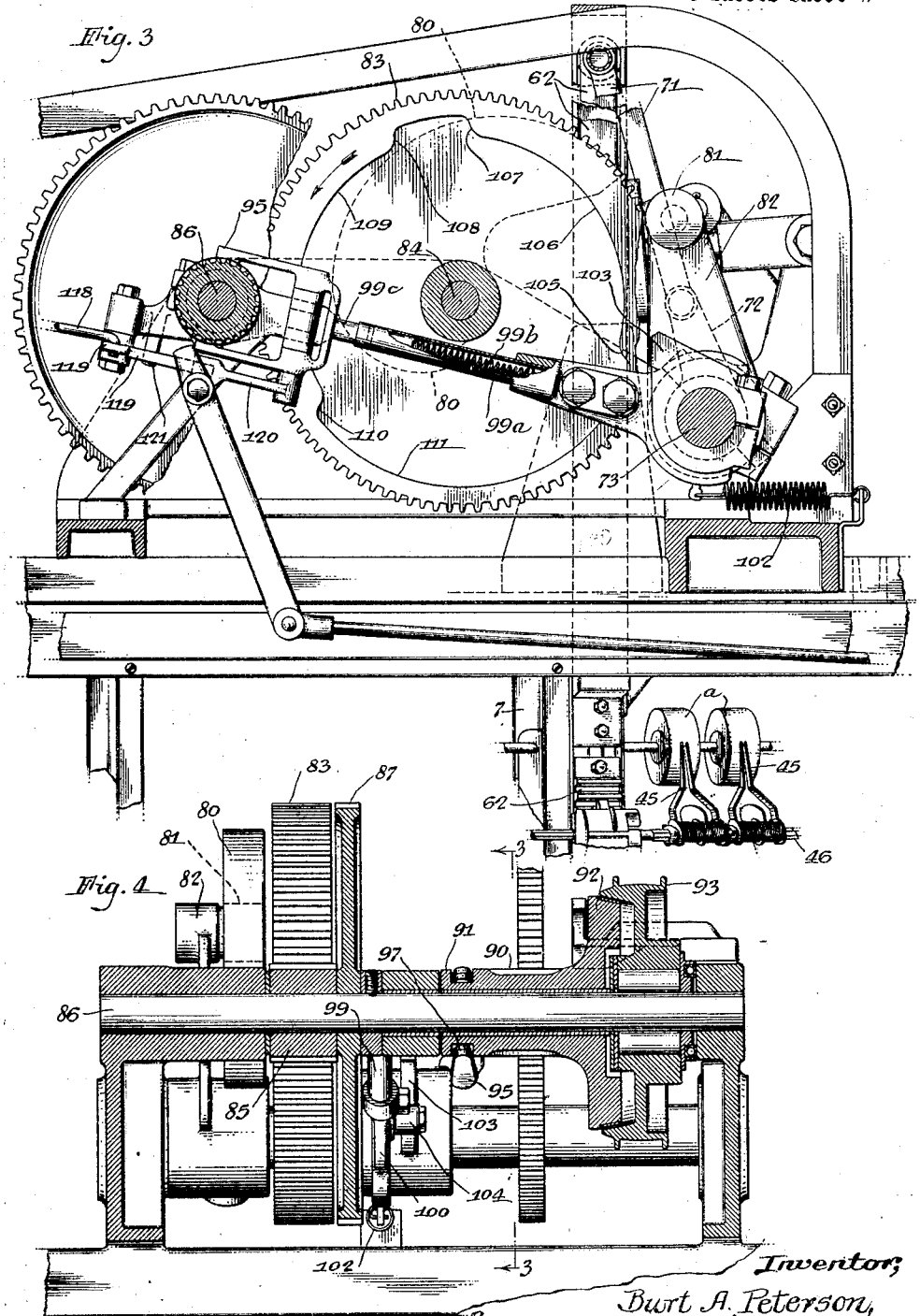

Jan. 17, 1928.  1,656,605
B. A. PETERSON
WARPING APPARATUS
Filed Feb. 27, 1925  3 Sheets-Sheet 3
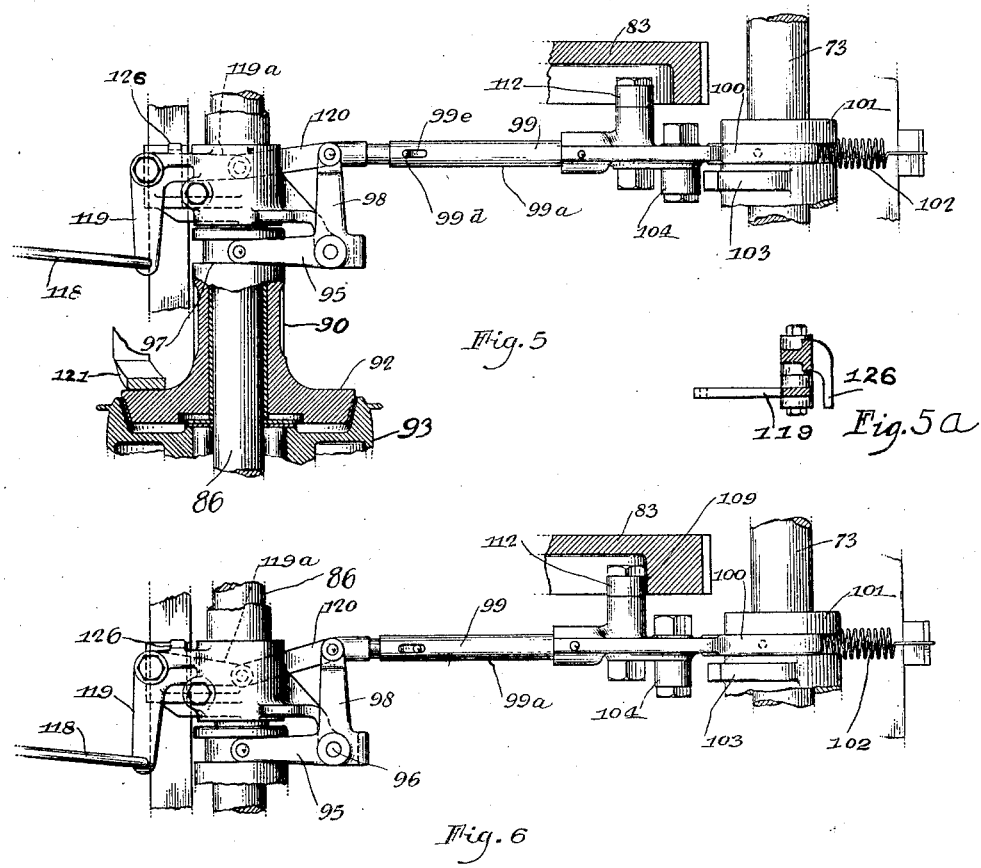
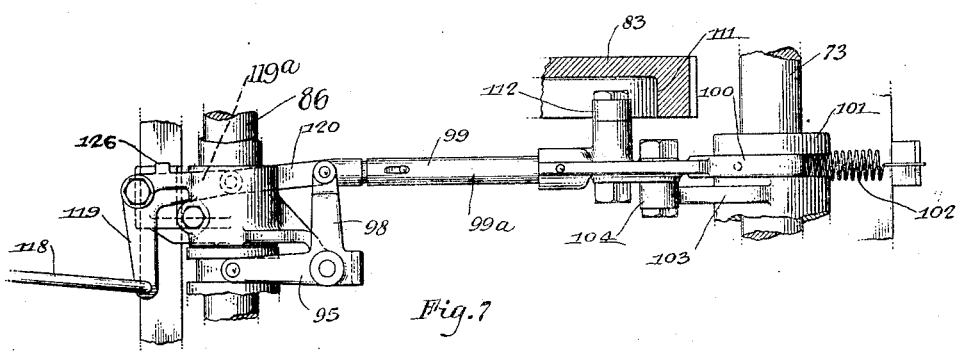
Inventor,
Burt A. Peterson,
By Chrindahl Parker Carlson
Attys.

Patented Jan. 17, 1928.

1,656,605

UNITED STATES PATENT OFFICE.

BURT A. PETERSON, OF ROCKFORD, ILLINOIS, ASSIGNOR TO BARBER-COLMAN COMPANY, OF ROCKFORD, ILLINOIS, A CORPORATION OF ILLINOIS.

WARPING APPARATUS.

Application filed February 27, 1925. Serial No. 11,904.

Application Serial No. 190,501, filed September 10, 1917, by Howard D. Colman, (now Patent No. 1,544,055) discloses a warping apparatus comprising a warper and a creel, the latter being adapted to support so-called cheeses, and being provided with brakes to stop the rotation of the cheeses upon breakage or excessive slackening of the yarn, the beam brake of the warper being simultaneously applied to stop the beam. Mechanism is provided which acts automatically immediately after stoppage of the warping apparatus to release the beam brake and place the cheese brakes in such position that they merely exert a light pressure upon the cheeses to prevent coasting thereof while the warper is being operated at low speed, or in case the threads be casually disturbed (this light pressure of the cheese brakes being hereinafter termed the drag pressure); and subsequently to remove the drag pressure and thus complete the resetting of the brake mechanism.

The mechanism shown in said Colman patent for resetting the brakes is driven by means of a belt shiftable onto and off from a tight pulley.

The object of the present invention is to provide improved means for driving said resetting mechanism and for throwing it into and out of operation.

In the accompanying drawings, Figure 1 is a top plan view of a creel provided with a brake-operating mechanism embodying the features of this invention.

Fig. 2 is an elevation of the mechanism shown at the left-hand end of Fig. 1.

Fig. 3 is a vertical sectional view taken in the plane indicated by dotted lines 3—3 in Figs. 1 and 4.

Fig. 4 is a vertical sectional view taken in the plane of line 4—4 of Fig. 1.

Figs. 5, 6 and 7 are plan views of the clutch and clutch operating mechanism. Fig. 5 shows the parts in the normal position of rest. In Fig. 6 the clutch is in the throw-in position and the cam wheel 83 is revolving. In Fig. 7 the clutch is locked out of operation.

Fig. 5a is a sectional detail view, showing the bell crank 119 in the position occupied in Fig. 5.

While the framework of the creel may be of any suitable character, it is herein shown as comprising two frames 6 and 7 arranged to form a V-shaped structure. Two of the cheeses are indicated at $a$ in Fig. 3. The brake members are marked 45. These brake members are actuated by a shaft 46. As will be understood, there are a number of shafts 46 at each side of the V-shaped creel. These shafts are arranged to be rocked to apply the brake members 45 to the cheeses $a$ and remove them therefrom by means including two vertically movable bars 62, one for each of the creel sections 6 and 7, said bars being suitably guided upon the creel sections. The bars 62 are moved up and down simultaneously by means including two connecting rods 71. One of which is shown in Fig. 3, said connecting rods being pivoted to crank arms 72 (Figs. 1 and 3). The crank arms 72 are fixed upon the ends of a rock shaft 73.

Spring means 74 (Fig. 1), such, for example, as that fully disclosed in said Colman Patent No. 1,544,055, is employed to turn the shaft 73 in the direction to apply the brakes. Said spring means may be normally restrained from turning the shaft 73 by any suitable means, as, for example, that shown in said Colman Patent No. 1,544,055, or that shown in the Peterson & Cummings application Serial No. 683,563, filed December 31, 1923 (now Patent No. 1,575,933).

The means for turning the shaft 73 to withdraw the brake arms 45 from the cheeses comprises a cam 80 arranged to engage a roller 81 carried by an arm 82 fixed on the shaft 73. The cam 80 is rigid with a spur gear 83 which is rotatably mounted upon a shaft 84. The gear wheel 83 meshes with a pinion 85 which is rotatable on a fixed shaft 86. Rigid with the pinion 85 is a spur gear wheel 87 that meshes with a pinion 88 rotatably mounted on the shaft 84. The pinion 88 is rigid with a spur gear wheel 89 that meshes with pinion teeth 90 formed in a clutch sleeve 91 which is slidable and rotatable upon the shaft 86. Integral with or otherwise connected to the clutch sleeve 91 is a friction clutch disk 92 adapted to engage a friction driving surface on a pulley 93, which is rotatably mounted on the shaft 86. The pulley 93 may be driven from any suitable source of power by means of a belt 94. It will be seen that when the clutch disk 92 is engaged with the pulley 93, the cam 80 will be slowly driven through the train of reducing gears 85, 87, 88, 89 and 90. The means for throwing the clutch in and out comprises a shifter fork 95 which is pivoted at 96 and which has rollers running in a peripheral groove 97 in the clutch sleeve 91. Rigid with the shifter fork 95 is a crank arm 98 which is yieldingly connected to a sectional link 99. The link 99 comprises a tubular portion 99$^a$ (Fig. 3) containing an expansive spring 99$^b$ that bears against a rod 99$^c$ pivoted to the crank arm 98 which operates the shifter fork 95. A pin 99$^d$ (Fig. 5) in the rod 99$^c$ extends through an elongated slot 99$^e$ in the tubular portion 99$^a$. The link 99 further comprises a bifurcated end portion 100 which fits into a grooved sleeve or hub 101 fixed on the rock shaft 73. A coiled contractile spring 102 anchored at one end to the framework and connected at its other end to the bifurcated end 100 tends to move the link in the direction to throw out the clutch. The contraction of the spring 102 is limited by contact of the bifurcated end 100 with the shaft 73, as shown in Fig. 5.

Rigid with the hub 101 is a cam 103 arranged to engage a roller 104 on the link 99 to move said link in the direction to throw in the clutch. In the side of the gear wheel 83 adjacent to the link 99 is formed a cam comprising the cam surfaces 105, 106, 107, 108, 109, 110 and 111 arranged to engage a roller 112 on the link 99.

Means is provided for throwing in the clutch at will. Said means comprises a hand lever (not shown) connected to a link 113 (Fig. 1) pivoted to a crank arm 114 having a hub or sleeve 115 which is pivotally mounted upon a fixed shaft 116. The crank arm 114 has a pin-and-slot connection with a link 118 which is pivoted to one arm of a bell crank lever 119 pivoted in the supporting framework. The other arm 119$^a$ of the bell crank lever 119 is connected by means of a link 120 to the clutch-shifter arm 98. Normally the spring 102 holds the parts in the position shown in Fig. 5, with the clutch disk 92 disengaged from the pulley 93. 121 is a spring stop for said disk.

On the fixed shaft 116 (Fig. 2) is pivotally mounted a stop arm 122 having a hub 123. Said hub has a shoulder engaging a shoulder on the hub 115 of the crank arm 114. The stop arm 122 is connected to a coiled contractile spring 124 which is anchored to the framework of the creel. Normally the spring 124 holds the crank arm 114 at the rear end of the slot in the end of the link 118, as shown in Fig. 2.

Figs. 1 to 5 show the parts in the position occupied during high speed operation of the warping apparatus. In case of breakage or excessive slackening of a thread, the trip mechanism (which may be like that fully described in the Colman Patent No. 1,544,055 or the Peterson & Cummings Patent No. 1,575,933) releases the shaft 73 to the action of the spring means 74 hereinbefore referred to. Said spring means thereupon turns the shaft 73 counterclockwise, as viewed in Fig. 3, thereby forcing the bars 62 downwardly to apply the creel brakes and swinging the cam 103 against the roller 104. The tubular portion 99$^a$ of the link 99 is thereby pushed toward the shifter fork 95, placing the spring 99$^b$ under additional compression, thus enabling the spring 99$^b$ to swing the bell crank 95 in the direction to throw in the clutch, as shown in Fig. 6. Power is thereupon communicated to the gear wheel 83 through the train of reduction gears to turn the cam 80 in the direction indicated by the arrow in Fig. 3. In the course of its rotation the cam 80 engages the roller 81 and begins to turn the shaft 73 in the direction to release the beam brake and relieve the pressure of the cheese brakes until merely a drag pressure remains. Just before the cam 80 begins to turn the shaft 73 the dwell surface 109 passes under the roller 112, as shown in Fig. 6, thereby preventing the spring 102 from throwing out the clutch. By the time the beam brake has been thrown out and the creel brakes placed in drag position, the cam surface 109 passes out from under the roller 112, whereupon the spring 102 throws out the clutch (see Fig. 5), thus stopping the cam 80.

After correcting the cause of the stoppage, the operative places the warper in slow operation until she observes that all the threads are running properly. She then pulls the hand lever connected to the link 113, whereby the bell crank 119 is swung in the direction to throw in the friction clutch, whereupon the cam 80 resumes its rotation. The operative continues to pull the hand lever for a few seconds, thus giving the cam surface 106 time to pass under the roller 112, whereby the clutch is held thrown in until the cam 80 has removed the drag pressure, thrown in the high speed driving mechanism (not herein shown) and reset the beforementioned trip mechanism. By the time this has been accomplished, the high point of the cam 80 has revolved past the roller 81 (the shaft 73 being then restrained by said trip mechanism against counter-clockwise rotation under the influence of the beforementioned spring means 74) and the dwell surface 106 has passed out from under the roller 112, whereupon the spring 102 throws out the clutch. The mechanism disclosed herein then comes to rest in the position shown in Figs. 1, 3 and 5.

From the foregoing it will be understood that the clutch is automatically thrown in by the cam 103 and automatically thrown out by the spring 102 after the creel brakes are in the drag position, and that when the warper is to be restarted at high speed the clutch is manually thrown in by means of the bell crank 119 and subsequently automatically thrown out by the spring 102.

When it is desired to stop the warper, the trip mechanism may be manually operated to release the shaft 73 to the action of the brake-applying springs 74 by pulling the before-mentioned hand lever, said lever operating through a link 125 (Fig. 1) as explained in said Peterson & Cummings patent.

I have described the method of restarting the warper after a stoppage due to a broken or slack thread. When the warper is stopped for removal of a full beam and for replenishment of the creel, the mode of operation preparatory to restarting is somewhat different, as will now be explained.

When the warper stops through the action of the warper clock (not shown), the beam brake is released and the creel brake mechanism moved to the drag position, as previously described. The operative then disconnects the clutch on the warper as described in Peterson application Serial No. 706,834 filed April 16, 1924. She then pulls the before-mentioned hand lever, thus causing the resetting mechanism to remove the drag pressure from the cheeses and return to high speed operating position. The warper however does not operate, since it has been rendered inoperative, as described above. In the event there is slack in the threads running from the cheeses to the warper, this may be taken up by the operative stepping on the foot lever provided on the warper as described in the previously referred to Peterson application. This causes the warper to operate at slow speed, and as soon as the threads are under tension the operative pulls the herein before-mentioned hand lever, thus (through the action of the link 125) releasing the shaft 73 to the action of the spring means 74, whereby the beam brake and the creel brakes are applied. Immediately thereafter the operative pushes the hand lever and thus exerts pressure through the link 118 upon the bell crank 119 to force the bell crank 119 against the stop 126, as shown in Fig. 7, thereby straightening the toggle 119ª and 120 slightly past dead center. The clutch is thus thrown out and locked out of action, the throwing out occurring before the resetting cam 80 has turned more than a negligible distance. By reference to Fig. 7, it will be understood that the locking out of the clutch causes compression of the spring 99ᵇ. The apparatus is now at rest, with the beam brake and creel brakes set. The threads may now be severed, and the beam removed.

If when the warper is running it is necessary or desirable to stop the warper and leave the brakes on the cheeses, the operative pulls the before-mentioned hand lever and thus releases the brake-applying springs 74 to action, thereby promptly stopping the warper. As soon as the warper has stopped, the operative pushes on the hand lever and thereby throws out the clutch and locks it out of action, thus preventing the brake-resetting mechanism from releasing the beam brake and the creel brakes.

The means herein shown for driving the brake-resetting mechanism is relatively simple in construction and prompt in action.

I claim as my invention:

1. A warping apparatus having, in combination, creel brakes, means to reset the brakes, a friction clutch for driving said means, a shifter for operating the clutch, a sectional link, one section of which is connected to said shifter, a spring connected to the other section of the link for pulling the link in the direction to throw out the clutch, an expansion spring interposed between the sections of said link, said brake-resetting means including a rock shaft, a cam on said rock shaft adapted to push said link in the direction to throw in the clutch, said brake-resetting means also including a cam arranged to engage said link and thus control the first-mentioned spring, a bell crank lever, a link connecting one arm of said bell crank lever to said shifter, said bell crank lever arm and the last-mentioned link forming a toggle, and connections for operating the bell crank lever to throw in the clutch.

2. A warping apparatus having, in combination, creel brakes, means to reset the brakes, a friction clutch for driving said means, a shifter for operating the clutch, a sectional link, one section of which is connected to said shifter, a spring connected to the other section of the link for pulling the link in the direction to throw out the clutch, an expansion spring interposed between the sections of said link, said brake-resetting means including a rock shaft, a cam on said rock shaft adapted to push said link in the direction to throw in the clutch, said brake-resetting means also including means to control the first-mentioned spring, and connections for manually throwing in the clutch.

3. A warping apparatus having, in combination, creel brakes, means to reset the brakes, a friction clutch for driving said means, a shifter for operating the clutch, a sectional link, one section of which is connected to said shifter, a spring connected to the other section of the link for pulling the link in the direction to throw out the clutch, an expansion spring interposed between the sections of said link, said brake-resetting means including a rock shaft, a cam on said rock shaft adapted to move said link in the direction to throw in the clutch, said brake-resetting means also including means to control the first-mentioned spring, and manual means to throw in the clutch.

4. A warping apparatus having, in combination, creel brakes, means to reset the brakes, a friction clutch for driving said means, a spring tending to throw out the clutch, said brake-resetting means including a rock shaft, and a cam on said rock shaft arranged to throw in the clutch, said brake-resetting means also including a cam arranged to control the spring.

5. A warping apparatus having, in combination, creel brakes, means to reset the brakes, a clutch to drive said resetting means, a shifter for operating the clutch, a sectional link, one section of which is connected to said shifter, a spring connected to the other section of the link for pulling the link in the direction to throw out the clutch, an expansion spring interposed between the sections of said link, a rock shaft, a cam on said rock shaft adapted to push said link in the direction to throw in the clutch, a bell crank lever, and a link connecting one arm of said bell crank lever to said shifter, said arm and the last-mentioned link forming a toggle which may be manually thrown over dead center to lock the clutch out of action.

6. A warping apparatus having, in combination, creel brakes, means to reset the brakes, a friction clutch to drive said resetting means, a shifter for operating the clutch, a spring for actuating the shifter to throw out the clutch, a rock shaft, a cam on said rock shaft for actuating the shifter to throw in the clutch, a manually operable bell crank, and a link connecting one arm of said bell crank to said shifter, said arm and link constituting a toggle which may be manually moved over dead center to lock the clutch out of action.

7. A warping apparatus having, in combination, creel brakes, means to reset the brakes, a friction clutch to drive said resetting means, a shifter for operating the clutch, means for automatically actuating the shifter to throw the clutch in and out, a manually operable bell crank, and a link connecting one arm of said bell crank to said shifter, said arm and link constituting a toggle which may be manually moved over dead center to lock the clutch out of action.

8. A warping apparatus having, in combination, creel brakes, means to reset the brakes, a clutch to drive the resetting means, a shifter for operating the clutch, a sectional link, one section of which is connected to said shifter, a spring connected to the other section of the link for pulling the link in the direction to throw out the clutch, an expansion spring interposed between the sections of said link, and means to push said link in the direction to throw in the clutch.

9. A warping apparatus having, in combination, creel brakes, brake-resetting means, a clutch for driving said means, a spring tending to throw out the clutch, means to throw in the clutch when the brakes are applied, means to control the spring during the resetting of the brakes, and manually operable means to throw in the clutch.

10. A warping apparatus having, in combination, creel brakes, brake-resetting means, a friction clutch for driving said means, means to throw in the clutch during the setting of the brakes, and means to throw out the clutch upon the resetting of the brakes.

In testimony whereof, I have hereunto affixed my signature.

BURT A. PETERSON.